United States Patent [19]

Oles et al.

[11] Patent Number: 5,653,152

[45] Date of Patent: Aug. 5, 1997

[54] TOOLHOLDER FOR ROUGHING AND FINISHING A WORKPIECE

[75] Inventors: Edward J. Oles, Ligonier; John J. Prizzi, Greensburg, both of Pa.

[73] Assignee: Kennametal Inc., Latrobe, Pa.

[21] Appl. No.: 522,794

[22] Filed: Sep. 1, 1995

[51] Int. Cl.$^6$ ................................................. B23B 27/20
[52] U.S. Cl. .................... 82/1.11; 407/33; 407/119; 408/145; 408/1 R
[58] Field of Search ............................... 407/33, 35, 40, 407/41, 97, 114, 118, 119, 67, 69; 82/1.11; 409/131, 132; 408/144, 145, 224, 713, 1 R

[56] References Cited

U.S. PATENT DOCUMENTS

| | | |
|---|---|---|
| 3,482,295 | 12/1969 | Trent .................................. 29/95 |
| 3,733,665 | 5/1973 | Spriggs ............................... 407/41 |
| 3,739,442 | 6/1973 | Lovendahl ....................... 407/41 X |
| 3,792,524 | 2/1974 | Pomernacki ...................... 29/567 |
| 3,813,748 | 6/1974 | Lindemann ..................... 29/105 R |
| 3,872,561 | 3/1975 | Pomernacki ..................... 29/95.1 |
| 4,194,860 | 3/1980 | Hopkins ............................. 407/42 |
| 4,202,650 | 5/1980 | Erickson ............................ 407/46 |
| 4,285,618 | 8/1981 | Shanley, Jr. ...................... 407/54 |
| 4,330,227 | 5/1982 | Raye et al. ....................... 407/36 |
| 4,575,287 | 3/1986 | Oshnock et al. ................. 407/41 |
| 4,687,387 | 8/1987 | Roos ............................... 408/713 |
| 4,898,500 | 2/1990 | Nakamura et al. ............... 407/62 |
| 4,936,718 | 6/1990 | Proffitt ............................... 407/36 |
| 4,954,021 | 9/1990 | Tsujimura et al. ............... 407/35 |
| 4,990,036 | 2/1991 | Eklund et al. .................. 407/113 |
| 5,026,960 | 6/1991 | Slutz et al. ................... 219/69.17 |
| 5,074,721 | 12/1991 | Kress et al. .................... 407/119 |
| 5,102,268 | 4/1992 | Mitchell ............................ 407/36 |
| 5,139,372 | 8/1992 | Tanabe et al. .................. 407/118 |
| 5,156,501 | 10/1992 | Pawlik et al. ..................... 407/36 |
| 5,186,583 | 2/1993 | Nakayama et al. ............ 407/41 X |
| 5,188,490 | 2/1993 | Muendlein et al. ............. 408/146 |
| 5,193,948 | 3/1993 | Noggle ......................... 407/119 X |
| 5,236,740 | 8/1993 | Peters et al. .................... 427/249 |
| 5,240,356 | 8/1993 | Arai et al. ..................... 407/34 X |
| 5,256,008 | 10/1993 | Hansson et al. ................. 407/33 |
| 5,288,184 | 2/1994 | Heule ............................. 408/224 |
| 5,292,213 | 3/1994 | Massa et al. .................. 409/234 |
| 5,298,467 | 3/1994 | Hurtado et al. .................. 501/90 |
| 5,328,761 | 7/1994 | Omori et al. ................... 428/336 |
| 5,330,296 | 7/1994 | Beeghly et al. ................ 407/114 |
| 5,364,209 | 11/1994 | Santhanam et al. ............ 407/119 |
| 5,431,072 | 7/1995 | Christoffel ....................... 76/115 |
| 5,585,176 | 12/1996 | Grab et al. ..................... 428/336 |

FOREIGN PATENT DOCUMENTS

| | | |
|---|---|---|
| 0112957A1 | 12/1982 | European Pat. Off. . |
| 0089545A1 | 9/1983 | European Pat. Off. . |
| 0502834B1 | 8/1996 | European Pat. Off. . |
| 7624228 | 2/1978 | France . |
| 2802395A1 | 7/1978 | Germany . |
| 3540665A1 | 5/1987 | Germany . |
| 4307716A1 | 9/1994 | Germany . |
| 4423861A1 | 12/1994 | Germany . |
| 404310303 | 11/1992 | Japan . |
| 4310303 | 11/1992 | Japan . |
| 95000272 | 1/1995 | WIPO . |

OTHER PUBLICATIONS

American National Standard B212.4–1986, "American National Standard for Cutting Tools–Indexable Inserts–Identification System".

(List continued on next page.)

Primary Examiner—Daniel W. Howell
Assistant Examiner—Henry W. H. Tsai
Attorney, Agent, or Firm—John J. Prizzi

[57] ABSTRACT

A toolholder for removing material from a workpiece wherein the workpiece and toolholder are rotatable with respect to one another. The toolholder includes a body having a plurality of pockets. A roughing insert is carried in one of the pockets of the body. The roughing insert presents a roughing edge. The roughing insert is of a first grade. A finishing insert is carried in another of the pockets of the body. The finishing insert presents a finishing edge. The finishing insert is of a grade different than that of the roughing insert.

15 Claims, 2 Drawing Sheets

OTHER PUBLICATIONS

Kennametal Milling/87 Catalog (1986), pp. 1, 2, 5, 6, 88, 92, 175–183.

Kennametal Brochure "KCD25™ Diamond Film Coated Carbide Inserts" (1994).

Modern Metal Cutting, A Practical Handbook, Sandvik Coromant, 1996 Idereklam, Sandviken, Sweden, First North American Edition Edition Pub. 1996, ISBN 91 -97 22 99-3-0, pp, X-45 -X-55.

PCT Search Report Mailed Nov. 19, 1996, in International Application No. PCT/US96/12417, International Filing Date Jul. 30, 1996, Kennametal Inc. File Reference No. K-1277PC.

5,653,152

TOOLHOLDER FOR ROUGHING AND FINISHING A WORKPIECE

BACKGROUND OF THE INVENTION

The invention pertains to a toolholder for roughing and finishing a workpiece, as well as a method of using the same. More specifically, the invention pertains to a toolholder for roughing and finishing a workpiece, and a method of using the same, which provides an acceptable workpiece surface finish after only one pass of the toolholder relative to the workpiece.

In a typical material removal operation wherein the workpiece and the cutting insert move and rotate relative to each other, there are three basic components. These components comprise the cutting insert, the toolholder that carries the cutting insert, and the workpiece material. Typical material removal operations for which this invention is suitable include turning, threading, drilling, boring, and planing. In some of these types of material removal operations, the toolholder carries one or more cutting inserts in such a fashion that only one type of cutting insert engages the workpiece at any given time.

Although the specific process varies depending upon the workpiece material and the desired end result, many machining operations includes at least two cuts on, or passes relative to, the workpiece. In the typical first (or roughing) cut, a roughing insert engages the workpiece so as to remove a preselected volume of material therefrom so as to achieve a desired dimension and surface finish of the workpiece. After completion of the roughing cut, the roughing insert is either replaced by a finishing insert, or the roughing insert moves out of position and a finishing insert indexes into position, wherein the finishing insert engages the surface of the workpiece which has already been machined by the roughing insert so as to machine the workpiece to a desired final dimension and surface finish.

While the earlier arrangements of toolholders by which the roughing insert and a finishing insert sequentially engage the workpiece achieve satisfactory results, there remains room for improvement. This is especially the case with respect to the operating efficiencies associated with earlier processes in which the roughing insert and the finishing insert sequentially engage the workpiece.

In this regard, it would be desirable to provide a toolholder that carries both a roughing insert and a finishing insert so that the workpiece is roughed and finished in only one cut in contrast to a plurality of cuts. The efficiency of the overall machining process improves upon a decrease in the number of cuts necessary to produce a workpiece with the proper final dimension and final surface finish.

SUMMARY OF THE INVENTION

It is an object of the invention to provide a toolholder that carries both a roughing insert and a finishing insert so that the workpiece is roughed and finished in only one cut in contrast to a plurality of cuts.

In one form thereof, the invention is a toolholder for removing material from a workpiece wherein the toolholder and the workpiece are rotatable with respect to one another. The toolholder comprises a body which has a plurality of pockets wherein a roughing insert is carried in one of the pockets of the body. The roughing insert presents a roughing edge. The roughing insert is of a first grade. A finishing insert is carried in another of the pockets of the body. The finishing insert presents a finishing edge. The finishing insert is of a grade different than that of said roughing insert.

In another form thereof, the invention is a toolholder for removing material from a workpiece wherein the workpiece and the toolholder are rotatable with respect to one another. The toolholder comprises a body having a plurality of pockets. A roughing insert is carried by the body. The roughing insert presents a roughing edge. A finishing insert is carried by the body. The finishing insert presents a finishing edge. The finishing edge of the finishing insert is sharper than the roughing edge of said roughing insert.

In still another form thereof, the invention is a toolholder for removing material from a workpiece wherein the toolholder and the workpiece are rotatable with respect to one another. The toolholder comprises a body having a plurality of pockets. A roughing insert is carried by the body and presents a roughing edge. A finishing insert is carried by the body and presents a finishing edge. The body includes a forward face. The finishing edge of the finishing insert projects a greater distance from the forward face of the body than does the roughing edge of said roughing insert.

In still another form thereof, the invention is a method of removing material from a workpiece comprising the steps of: providing a toolholder with a face, the face containing a forward pocket and a rearward pocket; providing a roughing insert being positioned with the forward pocket wherein said roughing insert is of one grade; providing a finishing insert being positioned within the rearward pocket wherein the finishing insert is made from a grade different from the grade of each said roughing insert; moving the toolholder and workpiece relative to one another so that the roughing insert first engages the workpiece and then the finishing insert then engages the surface of the workpiece already engaged by the roughing insert.

BRIEF DESCRIPTION OF THE DRAWINGS

The following is a brief description of the drawings that form a part of this patent application.

DETAILED DESCRIPTION OF A PREFERRED EMBODIMENT

Figure 1:
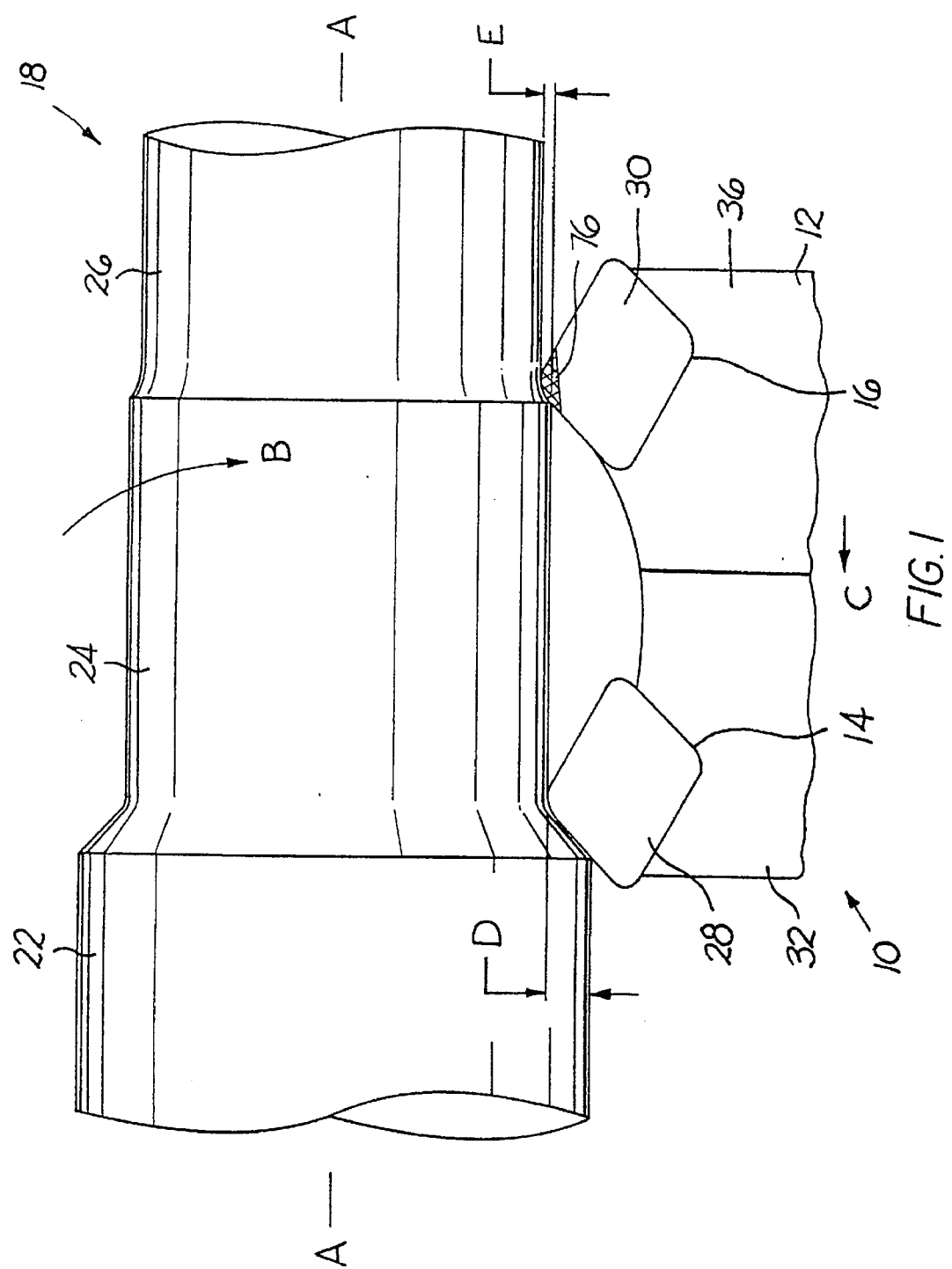
FIG. 1 is a side view of a specific embodiment of a toolholder of the invention illustrated in engagement with a workpiece that is in rotation about its central longitudinal axis.

Referring to the drawings, FIG. 1 depicts a specific embodiment of the toolholder of the invention, generally designated as 10. The toolholder 10 includes a body 12 along with pockets 14 and 16.

FIG. 1 also illustrates a workpiece, generally designated as 18, which rotates about its central longitudinal axis A—A. The workpiece 18 presents three surface conditions; namely, a pre-machined surface 22, a roughened surface 24, and a finished surface 26.

The pre-machined surface 22 is the surface condition of the workpiece prior to the commencement of any machining operation thereon.

The roughened surface 24 is the result of machining of the workpiece 18 by a roughing insert 28. As shown in FIG. 1, the roughing insert 28 is held in pocket 14 of the toolholder body 12.

The finished surface 26 is the result of machining of the workpiece by a finishing insert 30. As shown in FIG. 1, the finishing insert 30 is held in pocket 16.

The toolholder body 12 includes two basic parts; namely, a forward part 32 and a rearward part 36. These parts 32, 36 are movable relative to one another so that as the toolholder 10 comes to the end of a cut with the roughing insert 28, the forward part 32 of the toolholder body 12 retracts away from the workpiece, with the rearward part 36 not moving, so that the toolholder 10 may continue to move relative to the workpiece whereby the finishing insert 30 can finish the cut.

Figure 2:
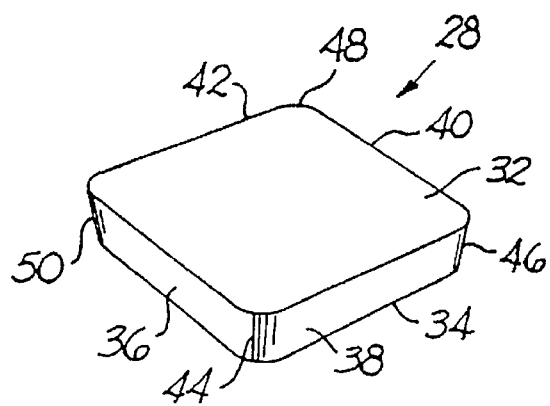
FIG. 2 is a perspective view of the thin film diamond roughing insert of the specific embodiment of FIG. 1.
Figure 3:
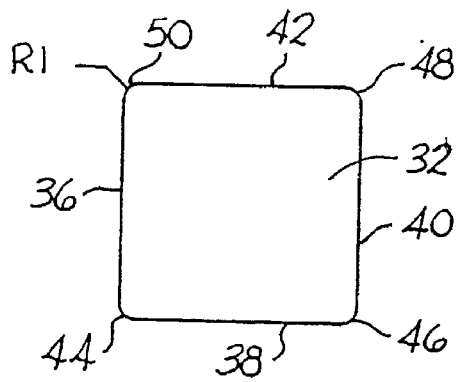
FIG. 3 is a top view of the roughing insert of FIG.2.
Figure 4:
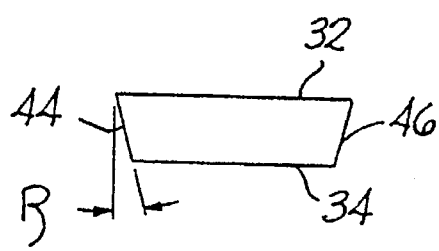
FIG. 4 is a side view of the roughing insert of FIG.2.

In the specific embodiment illustrated in the drawings, the roughing insert 28 is of an SPGN-422 style of insert ("American National Standard for Cutting Tools— Indexable Inserts Identification System", ANSI Standard B212.4-1986), which is a two-nose radius insert. As shown in FIGS. 2 through 4, the roughing insert 28 includes a top surface 32, a bottom surface 34, and four side surfaces 36, 38, 40 and 42. The joinder of adjacent side surfaces (36, 38, 40, 42) forms four corners (44, 46, 48, 50) that are radiused a radius "R1". (See FIG. 4). The side surfaces (36, 38, 40, 42) are disposed at an angle "β" (see FIG. 4) with respect to a plane perpendicular to the top surface 32 that equals 11 degrees.

Roughing insert 28 has a thin film of diamond thereon. Roughing insert 28 is commercially available as a KCD25 insert from Kennametal Inc. of Latrobe, Pa. The thin diamond film style of roughing insert is a subject of pending U.S. patent application Ser. No. 08/159,272 filed on Nov. 30, 1993 entitled "DIAMOND COATED TOOLS AND PROCESS FOR MAKING", and assigned to the assignee of the present application, now U.S. Pat. No. 5,585,176, which is hereby incorporated by reference herein. Due to the nature of the process of applying the thin diamond film to the substrate of the insert, the cutting edges (or roughing edges) of the roughing insert 28 are not as sharp as one would desire them to be. This is due to the fact that the substrate is honed prior to the application of the diamond coating. Although the roughing insert of the specific embodiment has a thin diamond film thereon, there is no intention to limit the scope of the invention to this specific type of roughing insert.

Figure 5:
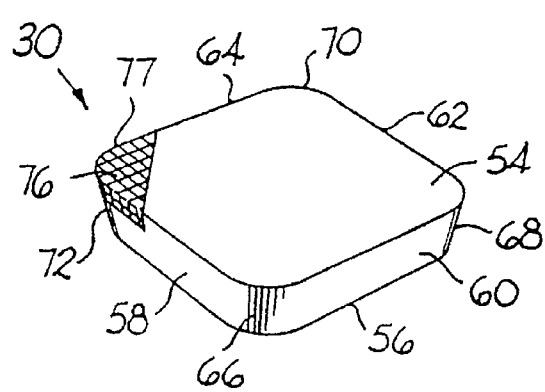
FIG. 5 is a perspective view of a finishing insert, which has a polycrystalline diamond composite tip, of the specific embodiment of FIG. 1.
Figure 6:
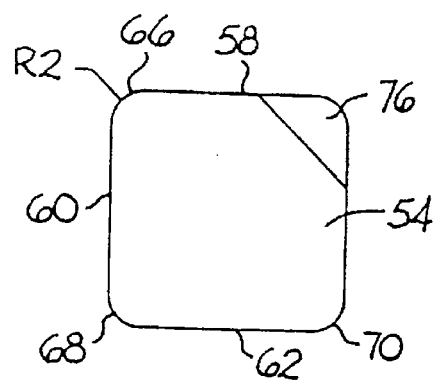
FIG. 6 is a top view of the finishing insert of FIG. 5.
Figure 7:
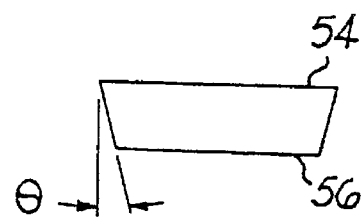
FIG. 7 is a side view of the finishing insert of FIG.5.

Referring to FIGS. 5 through 7, these drawings illustrate an embodiment of a finishing insert 30. The specific geometry of the finishing insert 30 is a three-nose radius style of insert, and this insert functions as the finishing insert 30 in this specific embodiment. The use of a three-nose radius insert is not intended to limit the scope of the present invention.

Finishing insert 30 includes a top surface 54, a bottom surface 56, and four side surfaces 58, 60, 62, and 64. The joinder of adjacent side surfaces forms four corners 66, 68, 70 and 72 that are radiused a radius "R2". (see FIG. 6) As shown in FIG. 7, the side surfaces are disposed at an angle "θ" with respect to a plane perpendicular to the top surface 54 that equals 11 degrees.

Referring to FIGS. 5 and 6, the finishing insert 30 has a polycrystalline diamond tip 76 that defines the top cutting edge (or finishing edge) 77 thereof. The use of a polycrystalline diamond tip 76 results in a finishing insert 30 that has a very sharp cutting edge 77. The wiping edge 77 of the finishing insert 30 is sharper than the cutting edge of the roughing insert 28.

The present disclosure describes a specific embodiment of a toolholder wherein there are three distinct differences between the roughing insert and the finishing insert. One area of difference lies in the grade of the inserts in that the finishing insert is a different grade from that of the roughing insert. A second area of difference lies in the surface roughness of the cutting edges of the insert in that the cutting edge of the finishing insert is sharper, and produces a smoother workpiece surface finish, than does the cutting edge of the roughing insert. A third area of difference lies in the distance the exposed cutting edges project from the forward face of the toolholder head. More specifically, the cutting edge of the finishing insert projects a greater distance from the forward face than does the cutting edge of the roughing insert.

In operation, the workpiece 18 rotates about its longitudinal axis A—A in the direction of the arrow "B". The toolholder 10 then moves in the direction "C" relative to the workpiece. The direction "C" is generally parallel to the central longitudinal axis A—A of the workpiece.

As can be appreciated, the first cutting insert to engage the surface of the workpiece is the roughing insert 28. This roughing insert 28 removes material from the workpiece to a specific depth "D" which also results in that portion of the workpiece (roughened surface 24) having a specified surface roughness. The finishing insert 30 next engages the roughened surface 24 so as to remove material to a depth "E" from the roughened surface to form the finished surface 26. The finished surface 26 is of a specified roughness. The end result of the above operation to, in one pass of the toolholder relative to the workpiece, produce a finished product that has a specified surface roughness and dimension.

It is specifically contemplated that the toolholder of the present invention, in addition to the turning tool shown in FIG. 1, may also be a drill or boring bar, for example, having at least one roughing insert and at least one finishing insert thereon.

All documents referred to in this specification are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A toolholder for removing material from a workpiece wherein the toolholder and the workpiece are rotatable with respect to one another, the toolholder comprising:

a body having a plurality of pockets;

a roughing insert being carried in one of the pockets of the body, the roughing insert presenting a roughing edge, the roughing insert being of a first grade of material;

a finishing insert being carried in another of the pockets of the body, the finishing insert presenting a finishing edge, the finishing insert being of a second grade of material different than that of said roughing insert;

wherein said body is selected from turning, drilling and boring tool bodies;

wherein said first grade of material forming said roughing insert comprises a substrate having a diamond film thereon so as to overlay the roughing edge of said roughing insert; and wherein said second grade of material forming said finishing insert presents a polycrystalline diamond composite portion that defines the finishing edge.

2. The toolholder of claim 1 wherein the roughing edge of the roughing insert projects a first distance from the forward face of the toolholder; the finishing edge of the finishing insert projects a second distance from the forward face of the toolholder; and the first distance being less than the second distance.

3. The toolholder of claim 1 wherein the finishing edge of the finishing insert produces a smoother workpiece surface finish that the roughing edge of said roughing insert.

4. The toolholder of claim 1 wherein the workpiece rotates relative to the toolholder.

5. The toolholder of claim 1 wherein the toolholder rotates relative to the workpiece.

6. The toolholder of claim 1 wherein the body of the toolholder includes a pair of portions, one of the portions carries the roughing insert, the one portion being movable with respect to the other one of the portions.

7. A toolholder for removing material from a workpiece wherein the workpiece and the toolholder are rotatable with respect to one another, the toolholder comprising:

a body having a plurality of pockets;

a roughing insert being carried by the body, the roughing insert presenting a roughing edge;

a finishing insert being carried by the body, the finishing insert presenting a finishing edge: and the finishing edge of the finishing insert being sharper than the roughing edge of said roughing insert.

8. The toolholder of claim 7 wherein the roughing insert is made from a selected grade of material, and the finishing insert is made from a grade of material different from that of the roughing insert;

wherein the selected grade of said roughing insert comprises a substrate with a thin diamond film thereon so as to overlay the roughing edge; and wherein the grade of material of said finishing insert comprises a polycrystalline diamond composite portion that defines said finishing edge.

9. The toolholder of claim 7 wherein the body includes a forward face, the finishing edge of the finishing insert projects a greater distance from the forward face of the body than does the roughing edge of said roughing insert.

10. A toolholder for removing material from a workpiece wherein the toolholder and the workpiece are rotatable with respect to one another, the toolholder comprising:

a body having a plurality of pockets;

a roughing insert being carried by the body and presenting a roughing edge;

a finishing insert being carried by the body and presenting a finishing edge;

the body including a forward face, the finishing edge of the finishing insert projects a greater distance from the forward face of the body than does the roughing edge of said roughing insert;

wherein said body is selected from the group of turning, drilling and boring tool bodies;

wherein the roughing insert is made from a selected grade of material, and the finishing insert is made from a grade of material different from that of the roughing insert;

wherein the selected grade of said roughing insert comprises a substrate with a thin diamond film thereon so as to overlay the roughing edge; and wherein the grade of material of said finishing insert comprises a polycrystalline diamond composite portion that defines said finishing edge.

11. The toolholder of claim 10 wherein the finishing edge of the finishing insert is sharper than the roughing edge of each said roughing insert.

12. A method of removing material from a workpiece comprising the steps of:

providing a toolholder with a face, the face containing a forward pocket and a rearward pocket;

providing a roughing insert being positioned with the forward pocket wherein said roughing insert is of a first grade of material;

providing a finishing insert being positioned within the rearward pocket wherein the finishing insert is made from a second grade of material different from the first grade of said roughing insert;

moving the toolholder and workpiece relative to one another so that the roughing insert first engages the workpiece and then the finishing insert then engages the surface of the workpiece already engaged by the roughing insert;

wherein said method is selected from the group of turning, drilling and boring;

wherein said first grade of material forming said roughing insert comprises a substrate with a thin diamond film thereon so as to overlay a roughing cutting edge thereof; and wherein said second grade of material forming said finishing insert comprises a polycrystalline diamond composite portion which defines a finishing cutting edge.

13. The method of claim 12 wherein said roughing insert has a roughing edge, the finishing insert has a finishing edge, and the roughing edge of said roughing insert projects a greater distance from the forward face of the toolholder than does the finishing edge of the finishing insert.

14. The method of claim 12 further including the step of retracting the roughing insert away from the workpiece after the completion of the engagement of the workpiece by the roughing insert.

15. The method of claim 12 further including the step of rotating the workpiece relative to the toolholder, and where the moving step includes moving the toolholder relative to the rotating workpiece.

* * * * *